United States Patent
Jeong et al.

(10) Patent No.: US 9,022,576 B2
(45) Date of Patent: May 5, 2015

(54) IMAGE CORRECTION APPARATUS, METHOD AND MEDIUM

(75) Inventors: Moon-sik Jeong, Seongnam-si (KR); Yong-beom Lee, Seoul (KR); Jong-Il Park, Seoul (KR); Tae-suh Park, Yongin-si (KR); Han-hoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1088 days.

(21) Appl. No.: 11/783,399

(22) Filed: Apr. 9, 2007

(65) Prior Publication Data

US 2008/0036785 A1 Feb. 14, 2008

(30) Foreign Application Priority Data

Aug. 10, 2006 (KR) .................. 10-2006-0075840

(51) Int. Cl.
*H04N 9/31* (2006.01)
*G09G 3/00* (2006.01)
*G09G 3/22* (2006.01)

(52) U.S. Cl.
CPC ............ *G09G 3/002* (2013.01); *H04N 9/3182* (2013.01); *H04N 9/3185* (2013.01); *H04N 9/3194* (2013.01); *G09G 3/22* (2013.01); *G09G 2310/0235* (2013.01)

(58) Field of Classification Search
CPC .. H04N 9/3194; H04N 9/3182; H04N 9/3185
USPC ........................................ 353/69, 79, 84, 85
See application file for complete search history.

(56) References Cited

U.S. PATENT DOCUMENTS

| | | | | |
|---|---|---|---|---|
| 7,128,441 | B2 * | 10/2006 | Monch | 362/277 |
| 7,542,055 | B2 * | 6/2009 | Matsuda et al. | 345/690 |
| 2003/0147053 | A1 * | 8/2003 | Matsuda et al. | 353/31 |
| 2003/0164927 | A1 * | 9/2003 | Tsukada | 353/31 |
| 2003/0179211 | A1 * | 9/2003 | Wada et al. | 345/589 |
| 2003/0214510 | A1 * | 11/2003 | Tajima | 345/600 |
| 2004/0021672 | A1 * | 2/2004 | Wada | 345/591 |
| 2004/0140981 | A1 * | 7/2004 | Clark | 345/600 |
| 2004/0140982 | A1 * | 7/2004 | Pate | 345/600 |
| 2005/0134808 | A1 * | 6/2005 | Pettitt | 353/84 |
| 2006/0067673 | A1 * | 3/2006 | Tanaka | 396/429 |
| 2006/0215128 | A1 * | 9/2006 | Iwanaga | 353/84 |
| 2006/0291014 | A1 * | 12/2006 | Hirata et al. | 358/504 |
| 2008/0273179 | A1 * | 11/2008 | Deppe et al. | 353/85 |

FOREIGN PATENT DOCUMENTS

| | | |
|---|---|---|
| JP | 2004-163876 | 6/2004 |
| JP | 2005-37771 | 2/2005 |

(Continued)

*Primary Examiner* — Sultan Chowdhury
*Assistant Examiner* — Bao-Luan Le
(74) *Attorney, Agent, or Firm* — NSIP Law (57) ABSTRACT

An image correction apparatus, method and medium which can perform color component correction and geometric correction using the property of a projector projecting light of a plurality of color components of an input image at different times is provided. The image correction method includes sequentially projecting light of a plurality of color components of an input image onto a projection surface at different times, acquiring color components of the projected light, and correcting the input image by comparing the acquired color components with the color components of the input image.

28 Claims, 6 Drawing Sheets

(56) References Cited

FOREIGN PATENT DOCUMENTS

| JP | 2005-123841 | 5/2005 |
| JP | 2005-151418 | 6/2005 |
| KR | 10-2004-0099166 | 11/2004 |
| KR | 10-2006-0044952 | 5/2006 |

* cited by examiner

IMAGE CORRECTION APPARATUS, METHOD AND MEDIUM

CROSS-REFERENCE TO RELATED APPLICATIONS

This application claims priority from Korean Patent Application No. 10-2006-0075840 filed on Aug. 10, 2006 in the Korean Intellectual Property Office, the disclosure of which is incorporated herein by reference in its entirety.

BACKGROUND

1. Field

One or more embodiments of the present invention relates to an image correction apparatus, method and medium, and more particularly, to an image correction apparatus, method and medium which can perform color component correction and geometric correction using the property of a projector projecting light of a plurality of color components of an input image at different times.

2. Description of the Related Art

Conventional projectors include liquid crystal display (LCD), digital light processing (DLP), cathode ray tube (CRT), and liquid crystal on silicon (LCoS) projectors.

Specifically, CRT projectors are direct-view type projectors, and LCD, DLP and LCoS projectors are projection type projectors. A CRT, which is usually employed in a direct-view type projector, includes a fluorescent panel on which red (R), green (G) and blue (B) phosphor dots and black stripes are formed. The CRT also includes R, G and B electron guns which emit electron beams corresponding to an input image. When the electron beams reach particular R, G and B phosphor dots via a shadow mask, the R, G and B phosphor dots are illuminated and produce colors.

LCD projectors, which are the most widely used projectors, produce an image by splitting light into R, G, and B components using pixels of three liquid crystal panels and collecting the split R, G and B components using a lens.

DLP projectors integrate thousands of microscopically small mirrors corresponding to pixels on a chip called a 'digital mirror device (DMD)." The mirrors tilt to reflect light at varying angles and, in so doing, produce an image from an input signal.

LCoS projectors are a relatively new technology which combines the LCD and DLP technologies. In LCoS projectors, LCDs are integrated on a silicon wafer, and circuits are formed on the LCDs. LCoS projectors consume low power, and provide high-resolution, full-color images. In addition, there is less of a limitation on the number of pixels in LCoS projectors than in LCD or DLP projectors. Therefore, high-resolution panels can be manufactured at low cost, one of the reasons why LCoS projectors are widely used.

Of the four types of projectors described above, DLP projectors split light from a light source into R, G and B components using a color wheel and project the R, G and B components at different times.

In order to perform image correction such as color component correction and geometric correction, a DLP projector temporarily stops projecting a current image and instead projects an image for color component correction and geometric correction.

For example, in the case of color component correction, a DLP projector sequentially projects (R, 0, 0), (0, G, 0) and (0, 0, B) images onto an entire projection plane in order to obtain a color mixing matrix and surface reflectivity. Then, the DLP projector performs color component correction on an input image so that a projected image can more closely resemble a target image.

In the case of geometric correction, the DLP projector estimates a geometric model of a projection plane by scanning, for example, a grating pattern of the projection plane and performs geometric correction based on the estimated geometric model.

In the case of color component correction, when an object is changed, the DLP projector has to update an image of the object by repeatedly projecting an image, in order to continuously obtain the color mixing matrix and the surface reflectivity. In the case of geometric correction, the scanning of a pattern may cause eye strain. Furthermore, since an image being projected is temporarily stopped to perform color component correction and geometric correction, user convenience may be undermined.

Korean Patent Publication No. 2004-099166 discloses a projection system generating a calibration signal for a white image and calibration signals for primary subtractive colors, projecting the calibration signals onto a screen, picking up a projected image using an image sensor, and generating image correction information using difference values between the picked-up signals. The conventional art is designed to generate image correction information using difference values between calibration images. However, the conventional art does not suggest solutions to problems which may occur when a DLP projector performs color component correction and geometric correction.

SUMMARY

One or more embodiments of the present invention provide an image correction apparatus, method and medium which can perform image correction, such as color component correction and geometric correction, using the property of a projector projecting light of an input image having a plurality of color components, at different times and without projecting an additional image.

Additional aspects and/or advantages of the invention will be set forth in part in the description which follows and, in part, will be apparent from the description, or may be learned by practice of the invention.

To achieve at least the above and/or other aspects and advantage, embodiments of the present invention include an image correction apparatus including an image projection unit to sequentially project light of a plurality of color components of an input image onto a projection surface at different times, an image acquisition unit to acquire color components of the projected light, and an image correction unit to correct the input image by comparing the acquired color components with the color components of the input image.

To achieve at least the above and/or other aspects and advantage, embodiments of the present invention include an image correction method including sequentially projecting light of a plurality of color components of an input image onto a projection surface at different times, acquiring color components of the projected light, and correcting the input image by comparing the acquired color components with the color components of the input image.

To achieve at least the above and/or other aspects and advantage, embodiments of the present invention include an image correction method, including projecting each of a plurality of color components of an input image onto a projection surface at different times, and comparing the input image with light from each of the plurality of color components acquired from the projection surface.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. One or more embodiments are described below to explain the present invention by referring to the figures.

Figure 1:
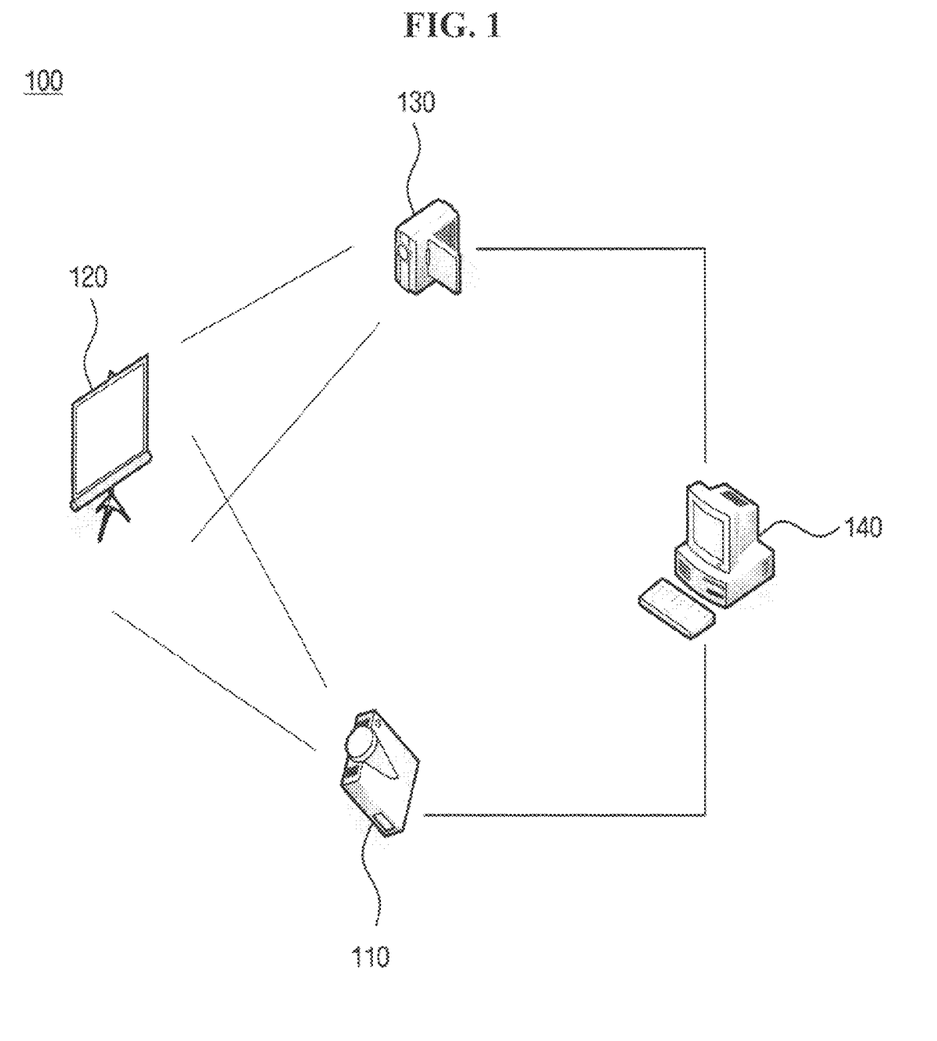
FIG. 1 illustrates an image correction apparatus, according to an embodiment of the present invention.

FIG. 1 illustrates an image correction apparatus 100, according to an embodiment of the present invention. Referring to FIG. 1, the image correction apparatus 100 may include an image projection unit 110 projecting light of a plurality of color components of an input image, an image acquisition unit 130 acquiring color components of the projected light, and an image correction unit 140 correcting the input image by comparing the acquired color components with the color components of the input image, for example.

In the present embodiment, the image projection unit 110 may be a digital light processing (DLP) projector which projects light of a plurality of color components at different times. The DLP projector may project an input image onto a screen 120 using a color wheel, which separates light emitted from a light source in response to the rotation of a motor into red (R), green (G) and blue (B) color components, and a plurality of digital mirror devices (DMDs).

The image projection unit 110 may control the number of times that the light of each color component is projected onto the screen 120 by adjusting the number of rotations of the color wheel in a predetermined frame, and the image acquisition unit 130 may acquire the light of each color component projected onto the screen 120. In the present embodiment, the image acquisition unit 130 may be understood as a device that can acquire a color component of light projected onto the screen 120, such as a camera, although other devices may be used.

Figure 2:
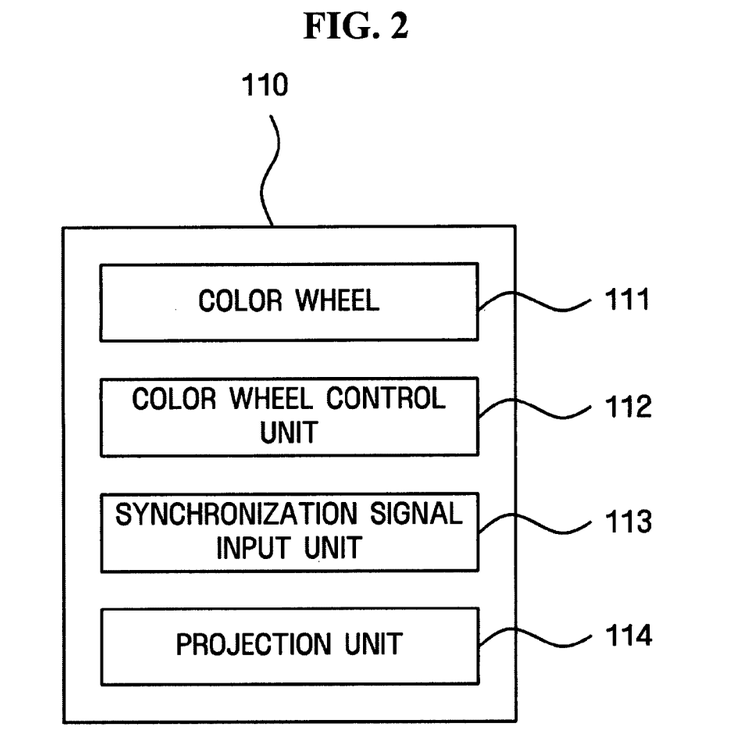
FIG. 2 illustrates an image projection unit, according to an embodiment of the present invention.

FIG. 2 illustrates an image projection unit 110, according to an embodiment of the present invention. The image projection unit 110 illustrated in FIG. 2 is, as an example, a DLP projector.

Referring to FIG. 2, the image projection unit 110 may include a color wheel 111, a color wheel control unit 112, a synchronization signal input unit 113, and a projection unit 114, for example.

The color wheel 111 may separate light from a light source into a plurality of color components, e.g., R, G and B components. The color wheel control unit 112 may control the per-frame number of rotations of the color wheel 111 in response to a synchronization signal input through the synchronization signal input unit 130. In other words, the number of times that light of a predetermined color component is projected onto the screen 120 may be controlled by the number of rotations per-frame of the color wheel 111, which is controlled by the color wheel control unit 112.

In the image projection unit 110, according to the present embodiment, the number of times that light of a predetermined color component is projected per frame may be set differently according to the type of image correction. The type of image correction in the present embodiment may include color component correction of an input image, as an example, and geometric correction in which a geometric model of the screen 120 is estimated and corrected (and the input image is corrected using the geometric model, as another example). However, embodiments of the present invention are not limited thereto.

Color component correction according to embodiments of the present invention will be described using, as an example, a case where the color wheel 111 rotates once per frame. However, geometric correction according to the present embodiment will be described using, as an example, a case where the color wheel 111 rotates twice per frame.

In a first embodiment of the present invention, in the case of color component correction, the projection unit 114 may project light of each color component instead of projecting an additional image for color component correction. In other words, a technique in which light of the color component is projected at different times is used. The image acquisition unit 130, which will be described later, may acquire the light of each color component projected at a different time.

In a second embodiment of the present invention, the light of each color component is projected twice per frame in the case of geometric correction. In this case, one light of a predetermined color component, which is projected twice within a predetermined frame, includes a pattern (hereinafter, referred to as a "positive (+) pattern") brighter than the brightness of the predetermined color component, and the other light of the predetermined color component includes a pattern (hereinafter, referred to as a "negative (−) pattern") darker than the brightness of the predetermined color component. The light of the predetermined color component is projected accordingly so that the average brightness of the frame may be maintained. In the second embodiment, the projection unit 114 may sequentially include the positive pattern and the negative pattern in the light of the predetermined color component and project the light accordingly. However, embodiments of the present invention are not limited thereto. The projection unit 114 may sequentially include the negative pattern and the positive pattern, e.g., in a reverse order, in the light of the predetermined color component, and project the light accordingly.

In the second embodiment of the present invention, the case in which the projection unit 114 includes patterns for geometric correction of light of a predetermined color component is described as an example. However, embodiments of the present invention are not limited thereto. In a third embodiment of the present invention, the color wheel 111 may also separate light into an infrared component, which is invisible, in addition to the R, G and B components and include the positive and negative patterns in the infrared region. Accordingly, a user may project the positive and negative patterns for geometric correction without actually perceiving the positive and negative patterns.

As described above, if patterns are included in light of each color component according to the second and third embodiments, a temporary stoppage of an image being projected onto the screen 120 may be prevented. As a result, eye strain experienced by a user when viewing an image projected onto the screen 120 may be prevented in advance.

Figure 3:
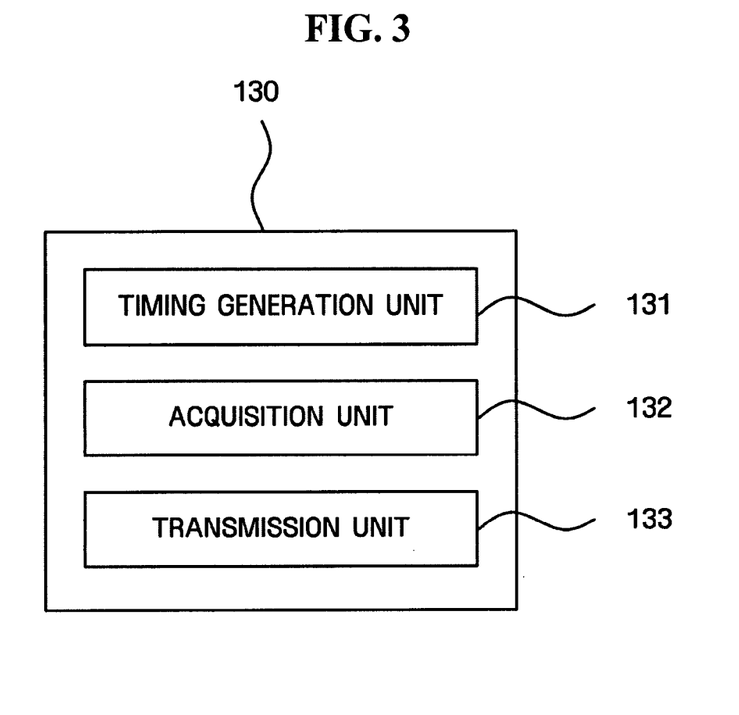
FIG. 3 illustrates an image acquisition unit, according to an embodiment of the present invention.

FIG. 3 illustrates an image acquisition unit 130, according to an embodiment of the present invention.

Referring to FIG. 3, the image acquisition unit 130 may include a timing generation unit 131, which receives information regarding a synchronization signal (receives a synchronization signal from the image projection unit 110 illustrated in FIG. 2), and generates an acquisition timing pattern in response to the received synchronization signal, an acquisition unit 132, which acquires color components of light projected onto the screen 120 according to the generated timing, and a transmission unit 133, which transmits the acquired color components to the image correction unit 140, for example.

When the projection unit 114 of the image projection unit 110 illustrated in FIG. 2 projects light of a predetermined color component, the timing generation unit 131 may generate a timing signal for acquiring color components of the projected light. The acquisition unit 132 may acquire the color components of the light projected onto the screen 120 according to the generated timing, for example.

In other words, the number of times that the image projection unit 110 of FIG. 2, described above, projects light of a predetermined color component per frame varies according to the type of image correction. Accordingly, the timing generation unit 131 may generate timing for acquiring color components of the projected light within a corresponding frame, according to the number of times that the image projection unit 110 projects the light of the predetermined color component.

For color component correction, color components acquired by the acquisition unit 132 may include a corresponding color component of light projected by the projection unit 114 of FIG. 2, and overlapping components between the corresponding color component and color components of adjacent wavelengths. For example, even if the projection unit 114 projects light of the R component, color components acquired by the acquisition unit 132 include an overlapping component between the R component and the G component, and an overlapping component between the R component and the B component, in addition to the R component. Therefore, even if light of each color component is projected once per frame, the number of color components acquired by the acquisition unit 132 amounts to nine, including overlapping components. The nine color components may be used as a color mixing matrix, for example, when the image correction unit 140, which will be described in greater detail later, performs color component correction.

For geometric correction, the acquisition unit 132 may acquire the positive pattern and the negative pattern included in light of a predetermined color component. If the color wheel 111, described above, separates the light into an infrared component in addition to the R, G and B components, the acquisition unit 132 may acquire light of the infrared component, including the positive pattern and the negative pattern, and then acquire the positive pattern and the negative pattern included in the infrared component.

The transmission unit 133 may transmit color components and patterns acquired by the acquisition unit 132 to the image correction unit 140, and the image correction unit 140 may perform color component correction and geometric correction using the received color components and patterns, for example.

First, in the case of color component correction, the image correction unit 140 corrects color components of an input image so that an image acquired using Equation 1 may have target color components.

$$C = VP + E \qquad \text{Equation 1}$$

$$C = \begin{bmatrix} C_R \\ C_G \\ C_B \end{bmatrix}, \quad V = \begin{bmatrix} V_{RR} & V_{RG} & V_{RB} \\ V_{GR} & V_{GG} & V_{GB} \\ V_{BR} & V_{BG} & V_{BB} \end{bmatrix},$$

$$P = \begin{bmatrix} P_R \\ P_G \\ P_B \end{bmatrix}, \quad E = \begin{bmatrix} E_R \\ E_G \\ E_B \end{bmatrix}$$

$$\begin{cases} C_R = f^{-1}(M) \\ C_G = f^{-1}(M), \\ C_B = f^{-1}(M) \end{cases} \quad \begin{cases} P_R = p(M) \\ P_G = p(M) \\ P_B = p(M) \end{cases}$$

where C denotes an acquired image, P denotes a projected image, V denotes a color mixing matrix, and E denotes environmental lighting. E may be obtained when P=0, that is, in a state in which a black image is projected. In addition, V in Equation 1 may be understood as the nine color components acquired by the image acquisition unit 130. Therefore, the image correction unit 140 may correct the projected image P so that the acquired image C may become a target image.

For geometric correction, the image correction unit 140 may estimate a geometric model of the screen 120 using a difference value between the positive pattern and the negative pattern included in light of a predetermined color component, and correct an input image based on the estimated geometric model. In the present embodiment, if the brightness of a predetermined color component is 100, the image correction unit 140 may set the positive pattern to 120 and the negative pattern to 80, for example. In so doing, the image correction unit 140 may perform geometric correction while maintaining average brightness of a corresponding frame. Therefore, a feeling of refusal felt by a user when viewing an image projected onto the screen 120 may be prevented.

Figure 4:
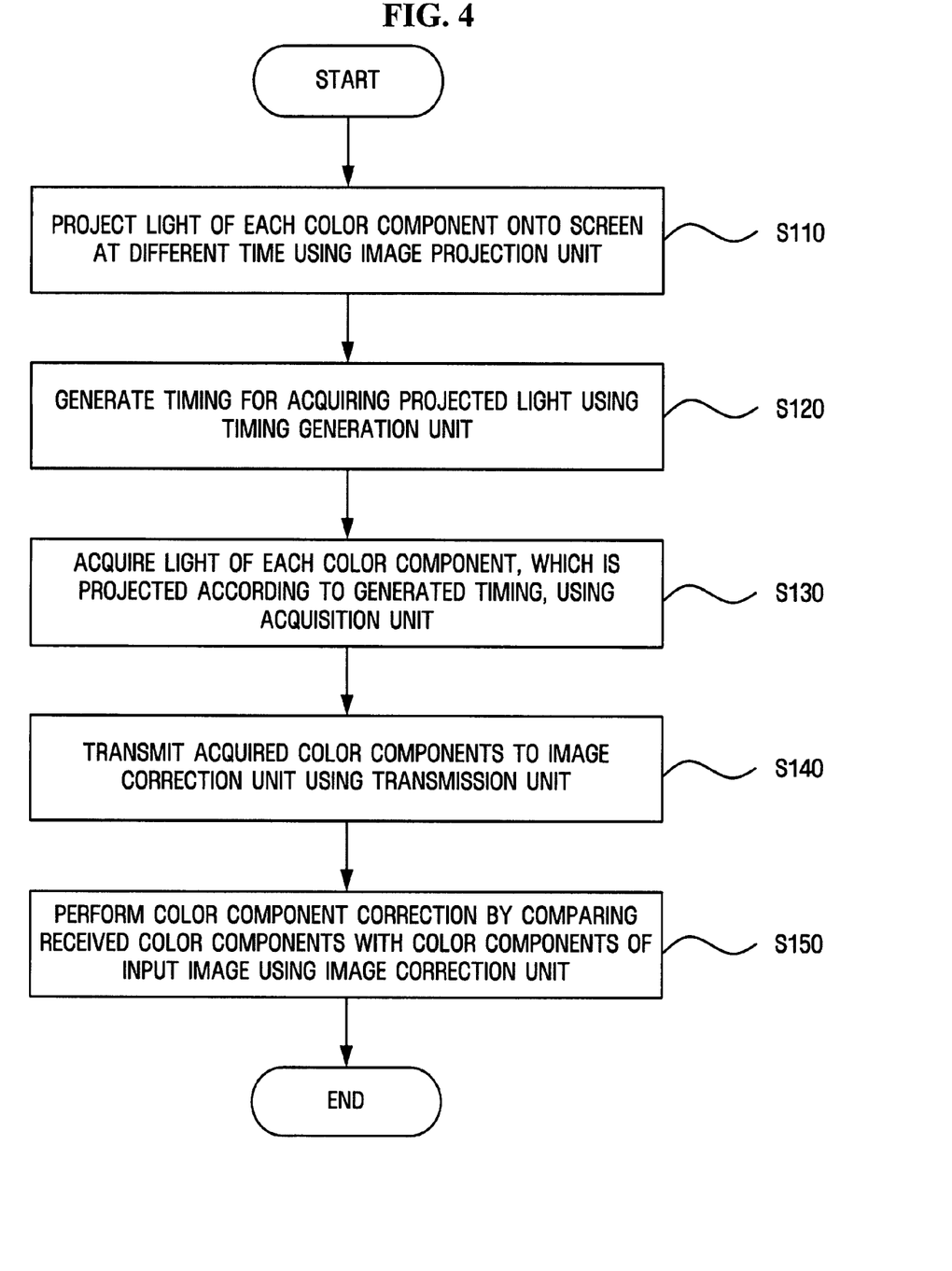
FIG. 4 is a flowchart illustrating a color correction method, according to an embodiment of the present invention.

FIG. 4 is a flowchart illustrating a color correction method, according to an embodiment of the present invention. The color correction method of FIG. 4 may be performed within a predetermined frame.

Referring to FIG. 4, light of a plurality of color components included in an input image may sequentially be projected onto the screen 120 at different times, e.g., by the image projection unit 110, in operation S110. A conventional DLP projector generally projects light of the R, G and B components twice per frame. However, for convenience of description, the present embodiment will be described using, as an example, a case where the image projection unit 110 projects light of the R, G and B components only once per frame.

A timing signal may be generated for acquiring projected light according to the time when the light of each color component is projected onto the screen 120, e.g., by the timing generation unit 131, in operation S120. Then, the light of each color component may be acquired according to the generated timing, e.g., by the acquisition unit 132, in operation S130. In this case, the acquired light of each color component may include a corresponding color component and overlapping components between the corresponding color component and color components of adjacent wavelengths. For example, even if the image projection unit 110 projects light of an R component $V_{RR}$, color components acquired, e.g., by the acquisition unit 132, may include overlapping components $V_{RG}$ and $V_{RB}$ of the R component $V_{RR}$ with G and B components, respectively, in addition to the R component $V_{RR}$. Similarly, even if light of the G component $V_{GG}$, is projected, e.g., by the image projection unit 110, color components acquired, e.g. by the acquisition unit 132, may include overlapping components $V_{GR}$ and $V_{GB}$ in addition to the G component $V_{GG}$. In addition, even if light of the B component $V_{BB}$, is projected, e.g. by the image projection unit 110, color components acquired, e.g. by the acquisition unit 132, may include overlapping components $V_{BR}$ and $V_{BG}$ in addition to the B component $V_{BB}$. Consequently, a total of nine color components may be acquired, e.g., by the image acquisition unit 110, and the nine acquired color components may be used as V, e.g., the color mixing matrix, in Equation 1 described above.

The acquired color components may be transmitted, e.g., by the image projection unit 110 to the image correction unit 140, in operation S140, and color correction may be performed on the projected image P, e.g., by the image correction unit 140 using Equation 1 so that the acquired image C may become the target image in operation S150.

Figure 5:
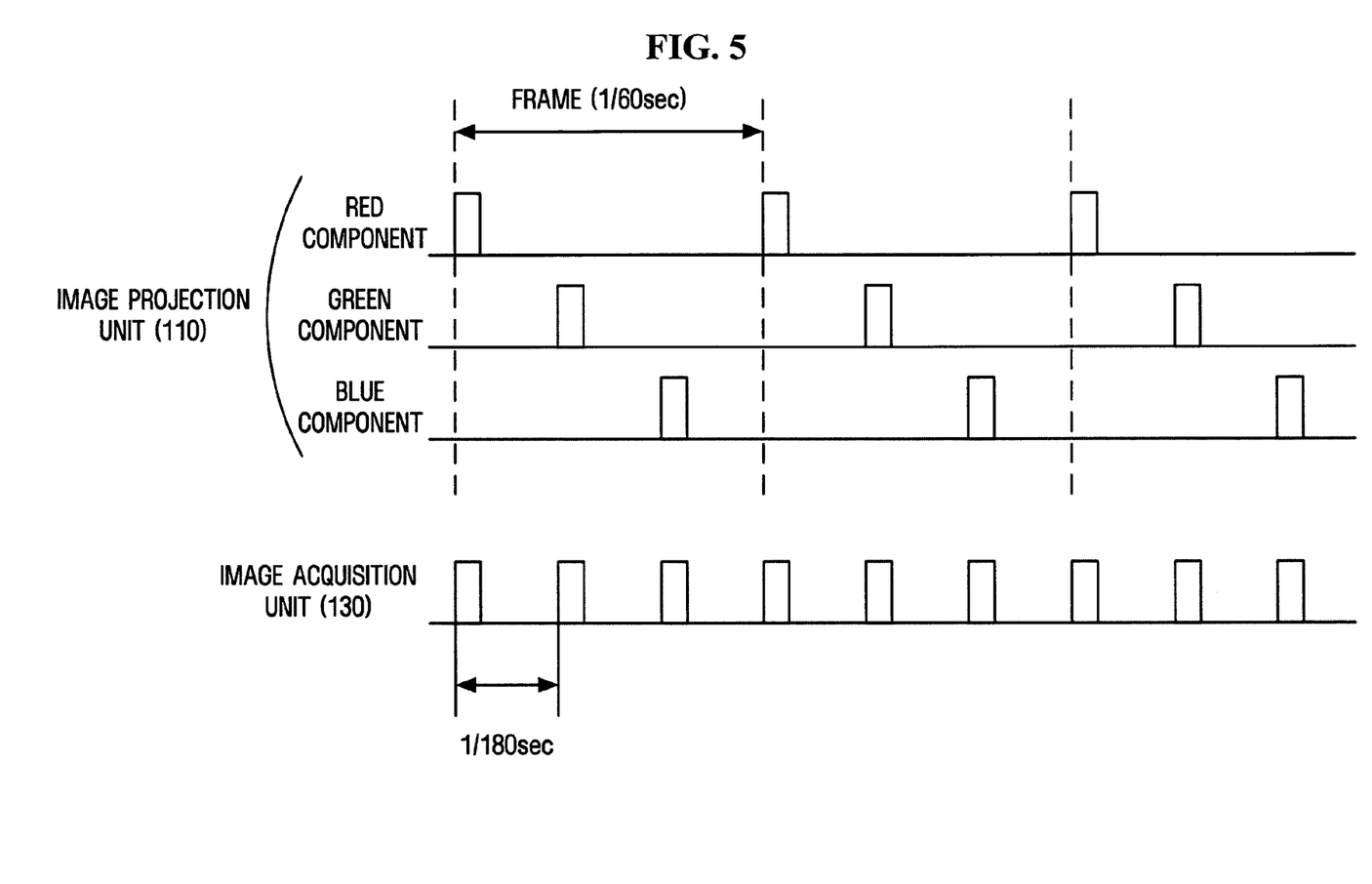
FIG. 5 is an operation timing diagram of the image projection unit and the image acquisition unit performing the color correction method of FIG. 4, according to an embodiment of the present invention.

FIG. 5 is an operation timing diagram, based on the example of the image projection unit 110 and the image acquisition unit 130 performing the color correction method of FIG. 4.

Referring to FIG. 5, the image projection unit 110 may project light of the R, G and B components per frame, and the image acquisition unit 130 may acquire the light of the R, G and B components. If a frame is 1/60 seconds, the image acquisition unit 130 may acquire projected light by setting a frame rate to 1/180 seconds and setting an exposure time to 1/180 seconds or less. In addition, the light acquired at a frame rate of 1/180 seconds may include overlapping components in addition to a corresponding color component.

Figure 6:
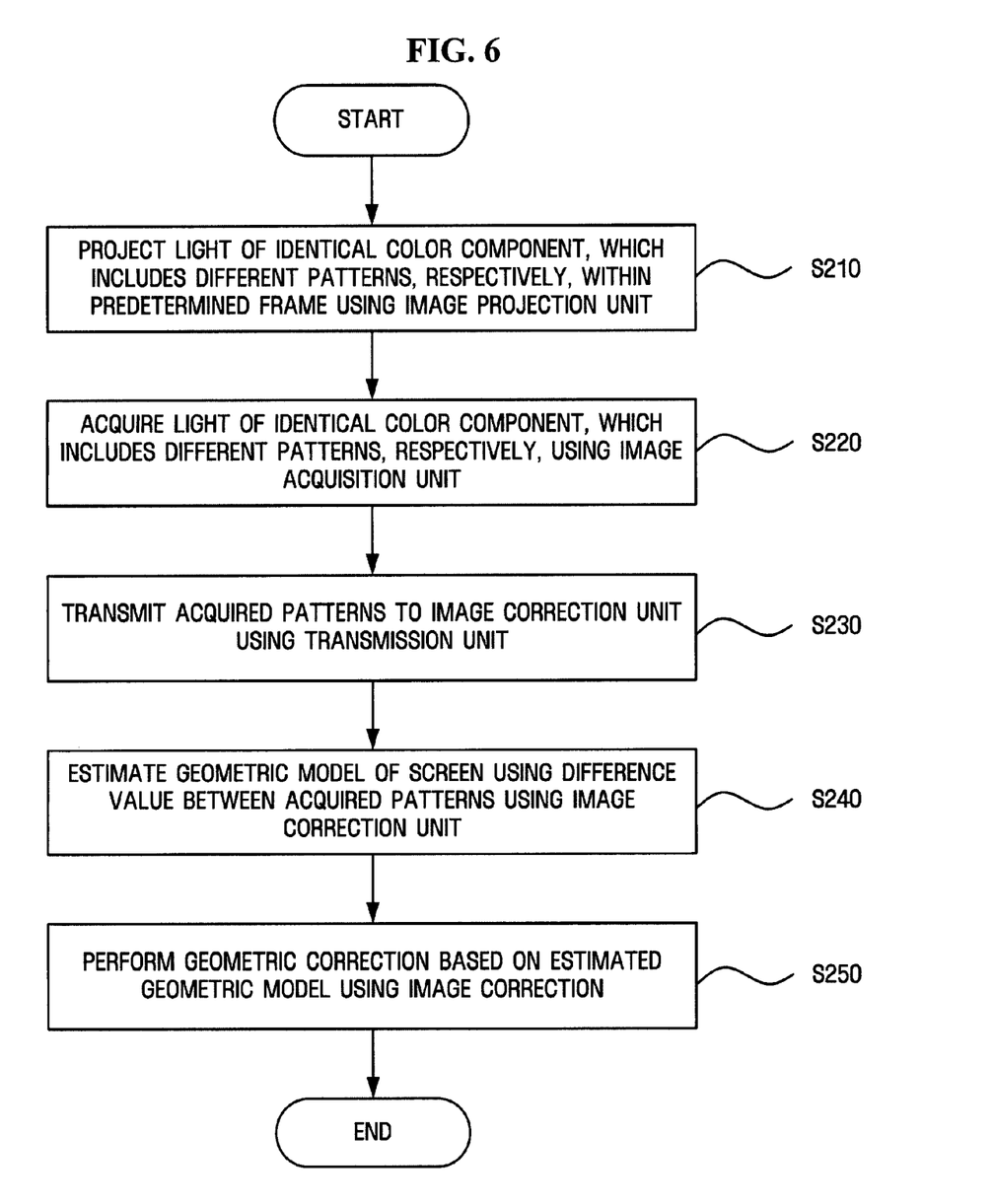
FIG. 6 is a flowchart illustrating a geometric correction method, according to an embodiment of the present invention.

FIG. 6 is a flowchart illustrating a geometric correction method, according to an embodiment of the present invention. The color wheel 111 may rotate twice per frame, for example, in the geometric correction method of FIG. 6.

Referring to FIG. 6, the positive pattern and the negative pattern may be included in light of a predetermined color component, e.g., by the image correction unit 140, and the light of the predetermined color component may be projected, e.g., onto the screen 120, in a predetermined frame, in operation S210. In an embodiment, the positive pattern and the negative pattern may be sequentially included in the light of the predetermined color component, e.g., by the image projection unit 110, and the light projected accordingly. However, embodiments of the present invention are not limited thereto. The negative pattern and the positive pattern may be sequentially included in the light of the predetermined color component, e.g., by the image projection unit 110, and the light projected accordingly.

The light including the positive pattern and the negative pattern may be acquired, e.g., by the image acquisition unit 130, in operation S220. In other words, if a frame is 1/60 of a second and light of the R component is projected twice, the light of the R component may be projected at a frame rate of 1/120 seconds and at an exposure time of 1/360 seconds or less. Therefore, the light of the R component, which is projected every 1/120 seconds, may be acquired, e.g., by the image acquisition unit 130.

In addition, the acquired positive and negative patterns may be transmitted, e.g., by the image acquisition unit 130 to the image correction unit 140, in operation S230. Then, a geometric model may be estimated, e.g., of the screen 120 by the image correction unit 140, based on a difference value between the positive and negative patterns, in operation S240 and geometric correction may be performed according to the estimated geometric model in operation S250.

The aspect where the positive and negative patterns are to be included in light of a predetermined color component and the light is projected, e.g., by the image projection unit 110, has been described above as an example with reference to FIG. 6. However, embodiments of the present invention are not limited thereto. If light may be separated into a nonvisible infrared component, e.g, by the color wheel 111, in addition to the R, G and B components, the positive and negative patterns may be included in light of the infrared component, e.g., by the image projection unit 110, and the light of the infrared component projected. Furthermore, after the positive and negative patterns included in the light of the infrared component are acquired, e.g., by the image acquisition unit 130, geometric correction may be performed according to operations S230 through S250 in the geometric correction method of FIG. 6, e.g., by the image correction unit 140.

Figure 7:
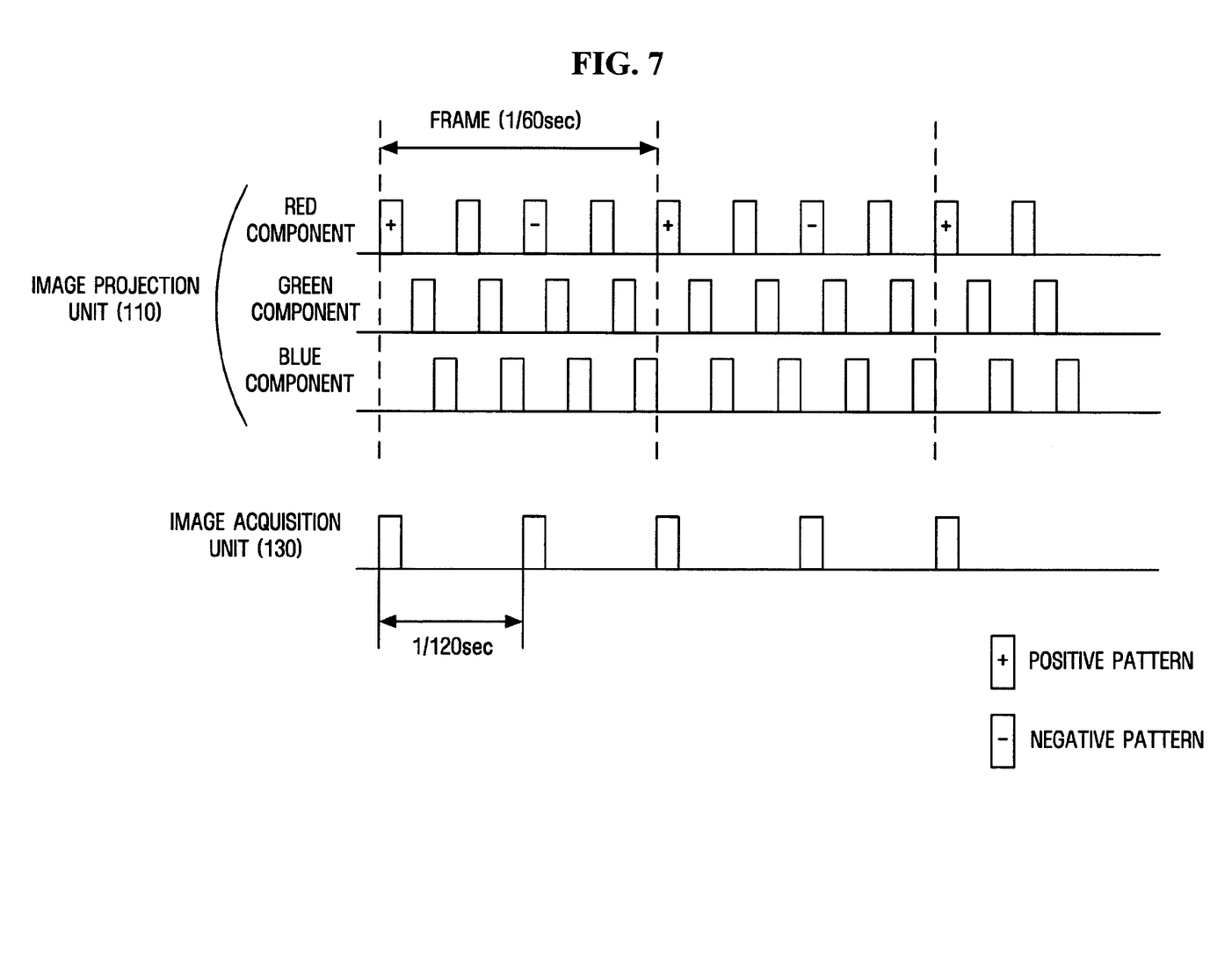
FIG. 7 is an operation timing diagram of the image projection unit and the image acquisition unit performing the geometric correction method of FIG. 6, according to an embodiment of the present invention.

FIG. 7 is an operation timing diagram, based on the example of the image projection unit 110 and the image acquisition unit 130 performing the geometric correction method of FIG. 6 described above. It may be understood that a case where the positive and negative patterns are included in the light of the R component is illustrated in FIG. 7 as an example. It may also be understood that FIG. 7 illustrates a 1-chip 4×DLP projector. While light of an identical color component is projected twice per frame in FIG. 6, the 1-chip 4×DLP projector of FIG. 7 projects light of an identical color component four times per frame, as an example.

Referring to FIG. 7, if the color wheel 111 rotates twice per frame, light of the R component may be projected four times. In this case, if the brightness of the light of the R component is 100, the positive pattern having the brightness of 120 and the negative pattern having the brightness of 80 may be included in the light of the R component. Therefore, different patterns may be included in the light of the R component while the average brightness of a frame is maintained. Consequently, a feeling of refusal felt by a user when viewing an image may be prevented.

As described above, an image correction apparatus, method and medium according to one or more embodiments of the present invention provide at least one of the following advantages.

First, image correction, such as color component correction and geometric correction, may be performed without requiring additional elements, and based on the property that each color component is projected at a different time. Therefore, the time required to perform image correction may be reduced.

Second, since image correction can be performed for every frame, an image of a moving object can easily be corrected.

The term 'unit', as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

An image correction apparatus, method and medium according to embodiments of the present invention has been described herein with reference to block diagrams or flowchart illustrations. It will be understood that each block of the flowchart illustrations, and combinations of blocks in the flowchart illustrations, may be implemented using computer program instructions.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded onto a computer or other programmable data processing apparatus to cause a series of operations to be performed on the computer or other programmable apparatus to produce a computer implemented method such that the instructions that execute on the computer or other programmable apparatus provide operations for implementing the functions specified in the flowchart block or blocks.

Each block of the flowchart illustrations may represent a module, segment, or portion of code, which comprises one or more executable instructions for implementing the specified logical function(s). It should also be noted that in some alternative embodiments, the functions noted in the blocks may occur out of the order. For example, two blocks shown in succession may in fact be executed substantially concurrently or the blocks may sometimes be executed in the reverse order, depending upon the functionality involved.

In addition, the computer program instructions may be implemented through computer readable code/instructions in/on a medium, e.g., a computer readable medium, to control at least one processing element to implement any above described embodiment. The medium may correspond to any medium/media permitting the storing and/or transmission of the computer readable code.

The computer readable instructions may be recorded/transferred on a medium in a variety of ways, with examples of the medium including magnetic storage media (e.g., ROM, floppy disks, hard disks, etc.) and optical recording media (e.g., CD-ROMs, or DVDs). The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image correction apparatus comprising:
    an image projection unit to sequentially project light of a red color component of a first input image, a green color component of the first input image, and a blue color component of the first input image onto a projection surface at different intervals within a predetermined frame of a predetermined duration;
    an image acquisition unit to acquire, at the different intervals within the predetermined frame, nine color components comprising the projected red color component, an overlapping RG color component between the projected red color component and the projected green color component, an overlapping RB color component between the projected red color component and the projected blue color component, an overlapping GR color component between the projected green color component and the projected red color component, the projected green color component, an overlapping GB color component between the projected green color component and the projected blue color component, an overlapping BR color component between the projected blue color component and the projected red color component, an overlapping BG color component between the projected blue color component and the projected green color component, and the projected blue color component; and
    an image correction unit to correct the color components or geometry of a second input image based on a comparison of the acquired nine color components with the color components of the first input image.

2. The apparatus of claim 1, wherein the image projection unit sequentially projects the red, green, and blue components in a predetermined order.

3. The apparatus of claim 2, wherein the image acquisition unit acquires the light of the color components in an order in which the color components are projected.

4. The apparatus of claim 1, wherein the image projection unit projects the light of each color component at least twice in the predetermined frame.

5. The apparatus of claim 4, wherein light of an identical color component projected within the predetermined frame respectively comprises different patterns in order to estimate a geometric model of the projection surface.

6. The apparatus of claim 5, wherein the image correction unit estimates the geometric model of the projection surface based on the patterns and corrects the second input image using the estimated geometric model.

7. The apparatus of claim 5, wherein the color components of the light projected by the image projection unit comprise the red component, the green component, the blue component and an infrared component, and the patterns are included in the infrared component.

8. The apparatus of claim 1, wherein in the image projection unit, a number of times that light of a predetermined color component is projected within the predetermined frame is set differently according to a type of image correction to be performed.

9. The apparatus of claim 1,
    wherein the image acquisition unit first acquires the projected light of the red component, then acquires the projected light of the green component after a predetermined time greater than zero, and then acquires the projected light of the blue component after a predetermined time greater than zero.

10. An image correction method comprising:
    sequentially projecting light of red color component of a first input image a green color component of the first input image, and a blue color component of the first input image onto a projection surface at different intervals within a predetermined frame of a predetermined duration;
    acquiring, at the different intervals within the predetermined frame, nine color components comprising the projected red color component, an overlapping RG color component between the projected red color component and the projected green color component, an overlapping RB color component between the projected red color component and the projected blue color component, an overlapping GR color component between the projected green color component and the projected red color component, the projected green color component, an overlapping GB color component between the projected green color component and the projected blue color component, an overlapping BR color component between the projected blue color component and the projected red color component, an overlapping BG color component between the projected blue color component and the projected green color component, and the projected blue color component; and correcting, by an image correction unit, the color components or geometry of a second input image based on a comparison of the acquired nine color components with the color components of the first input image.

11. The method of claim 10, wherein the projecting of the light of the color components comprises sequentially projecting the red, green and blue components in a predetermined order.

12. The method of claim 11, wherein the acquiring of the color components comprises acquiring the light of the color components in an order in which the color components are projected.

13. The method of claim 10, wherein the projecting of the light of the color components comprises projecting the light of each color component at least twice in the predetermined frame.

14. The method of claim 13, wherein light of an identical color component projected within the predetermined frame respectively comprises different patterns in order to estimate a geometric model of the projection surface.

15. The method of claim 14, wherein the correcting of the second input image comprises estimating the geometric model of the projection surface based on the patterns and correcting the second input image using the estimated geometric model.

16. The method of claim 14, wherein the color components of the projected light comprise the red component, the green component, the blue component and an infrared component, and the patterns are included in the infrared component.

17. At least one non-transitory medium comprising computer readable code to control at least one processing element to implement the method of claim 10.

18. The method of claim 10, wherein in the sequential projecting of the light of each of the plurality of color components, a number of times that light of a predetermined color component is projected within the predetermined frame is set differently according to a type of image correction.

19. An image correction method, comprising:
projecting a red color component of a first input image, a green color component of the first input image, and a blue color component of the first input image onto a projection surface at different intervals within a predetermined frame of a predetermined duration; and comparing, by an image correction unit, the first input image with light from nine color components comprising the projected red color component, an overlapping RG color component between the projected red color component and the projected green color component, an overlapping RB color component between the projected red color component and the projected blue color component, an overlapping GR color component between the projected green color component and the projected red color component, the projected green color component, an overlapping GB color component between the projected green color component and the projected blue color component, an overlapping BR color component between the projected blue color component and the projected red color component, an overlapping BG color component between the projected blue color component and the projected green color component, and the projected blue color component acquired from the projection surface at the different intervals within the predetermined frame.

20. The method of claim 19, further comprising correcting the second input image based on the comparing.

21. The method of claim 20, wherein the projecting comprises sequentially projecting the red, green and blue components in a predetermined order.

22. The method of claim 21, wherein the projecting of the light of the color components comprises projecting the light of each color component at least twice in the predetermined frame.

23. The method of claim 21, wherein light of an identical color component projected within the predetermined frame respectively comprises different patterns in order to estimate a geometric model of the projection surface.

24. The method of claim 21, wherein the correcting of the second input image comprises estimating the geometric model of the projection surface based on the patterns and correcting the second input image using the estimated geometric model.

25. The method of claim 21, wherein the color components of the projected light comprise the red component, the green component, the blue component and an infrared component, and the patterns are included in the infrared component.

26. The method of claim 19, wherein the color components are acquired from the projection surface in an order in which the color components are projected.

27. At least one non-transitory medium comprising computer readable code to control at least one processing element to implement the method of claim 19.

28. The method of claim 19, wherein in the projecting of each of the plurality of color components of the first input image, a number of times that light of a predetermined color component is projected within the predetermined frame is set differently according to a type of image correction.

* * * * *